United States Patent [19]

Niblett

[11] Patent Number: 4,463,739
[45] Date of Patent: Aug. 7, 1984

[54] FUEL PREHEATER WITH VAPOR LOCK PREVENTION MEANS

[76] Inventor: Norman C. Niblett, P.O. Box 590, Salisbury, Md. 21801

[21] Appl. No.: 413,137

[22] Filed: Aug. 30, 1982

[51] Int. Cl.³ .......................................... F02M 31/00
[52] U.S. Cl. .................................................. 123/557
[58] Field of Search ............... 123/557; 261/144, 145; 165/52, 51

[56] References Cited

U.S. PATENT DOCUMENTS 1,361,503  12/1920  Smith ................................. 123/557
4,027,639   6/1977  Amano ............................... 123/557

FOREIGN PATENT DOCUMENTS 960534   1/1975  Canada .............................. 123/557
1025689  10/1950  France .............................. 123/557
  53629  12/1942  Netherlands ....................... 123/557

Primary Examiner—Ronald H. Lazarus
Attorney, Agent, or Firm—Gordon L. Peterson

[57] ABSTRACT

A fuel preheater for heating fuel being supplied through a fuel conduit from a fuel supply to the engine. Fuel heating is accomplished as a result of heat exchange between the fuel and engine coolant flowing in a coolant conduit. The preheater comprises a coolant tube adapted to have heated coolant flow therethrough and a fuel tube adapted to have fuel flow therethrough enroute to the engine. The fuel tube includes a coil having a plurality of convolutions extending around the exterior of the coolant tube and a downstream section extending through the coolant tube. The region of the downstream section between the most downstream convolution and the location at which the downstream section enters the coolant tube is spaced from the coolant tube in a way to minimize the likelihood of vapor lock.

5 Claims, 3 Drawing Figures

FUEL PREHEATER WITH VAPOR LOCK PREVENTION MEANS

BACKGROUND OF THE INVENTION

It has long been recognized that the efficiency and fuel economy of an internal combustion engine can be improved by preheating the fuel supplied to the carburetor. Fuel preheating can be accomplished by passing the fuel enroute to the carburetor in heat exchange relationship with engine coolant. Prior art fuel preheaters are shown by way of example in Dunnam U.S. Pat. No. 4,091,782, Rabbiosi U.S. Pat. No. 3,986,486 and DeShaies U.S. Pat. No. 3,253,647.

My copending application Ser. No. 347,348 entitled Fuel Preheater discloses a fuel preheater which is adapted for use with an engine coolant system which includes a coolant conduit through which coolant can flow and a fuel conduit for supplying fuel from a fuel supply to the engine. The preheater of my copending application includes a coolant tube and a fuel tube with a portion of the fuel tube forming a coil extending around the exterior of the coolant tube in heat exchange relationship therewith.

One problem with prior art fuel preheaters is that they tend to produce vapor lock under at least some operating conditions. Thus, vapor lock is more likely to occur, for example, on high compression engines or on engines operating in hot desert climates.

SUMMARY OF THE INVENTION

This invention provides a fuel preheater which is much less likely to produce vapor lock. This is accomplished by recognizing that vapor lock can be inhibited by controlling certain relationships in the heat exchanger used for preheating of the fuel.

More particularly, this invention can be embodied in a fuel preheater of the type disclosed in my copending application in which a fuel tube includes a coil having a plurality of convolutions extending around the exterior of a coolant tube in heat exchange relationship therewith so the coolant in the coolant tube can preheat the fuel in the coil. A downstream section of the fuel tube extends through the coolant tube. The most downstream of the convolutions terminates in the downstream section.

The region of the downstream section between the most downstream convolution and the location at which the downstream section enters the coolant tube is spaced from the coolant tube by a gap. This invention is based, in part, upon the recognition that vapor lock can be inhibited by controlling the gap. In particular, I have found that the maximum radial dimension of this gap should have a length of at least 1 1/16 inch for a 1½ inch diameter coolant line and preferably no greater than about 1¼ inch. Although results can differ from engine to engine, generally I consider a dimension of 1⅛ inch to be optimum.

The gap referred to is measured between the outside adjacent surfaces of the coolant tube and the fuel tube. Because the region joins a convolution which preferably contacts the coolant tube with a segment of the fuel tube which projects though the coolant tube, in a typical instance, the spacing between the tubes, i.e., the gap, will not be of constant radial dimension. It is the maximum or largest radial dimension of this gap which must be of at least the specified length.

Some prior art fuel preheaters constructed in accordance with my copending application referred to above had a gap between the downstream section and the coolant tube as a result of loosely winding the region of the fuel tube between the most downstream convolution and the section of the fuel tube extending through the coolant tube. However, the present invention is based, in part, upon the recognition that this gap is of significance to the vapor lock problem and that, by controlling this gap, vapor lock can be inhibited. It is not known why the control of the gap inhibits the vapor lock problem.

This invention also preferably employs an adjustable pressure regulator in the fuel tube located between the downstream section and the engine or elsewhere. Although fuel pressure regulators at this location are known, an advantage of the adjustability feature is that the fuel pressure can be tailored, not only to individual vehicle requirements, but to the changing pressure requirements of the vehicle. Thus, it has been found that, after using the fuel preheater of this invention with a particular engine for a length of time, the pressure regulator can be adjusted to better meet the demands of the engine.

The invention, together with additional features and advantages thereof, may best be understood by reference to the following description taken in connection with the accompanying illustrative drawing.

DESCRIPTION OF THE PREFERRED EMBODIMENT

Figure 1:
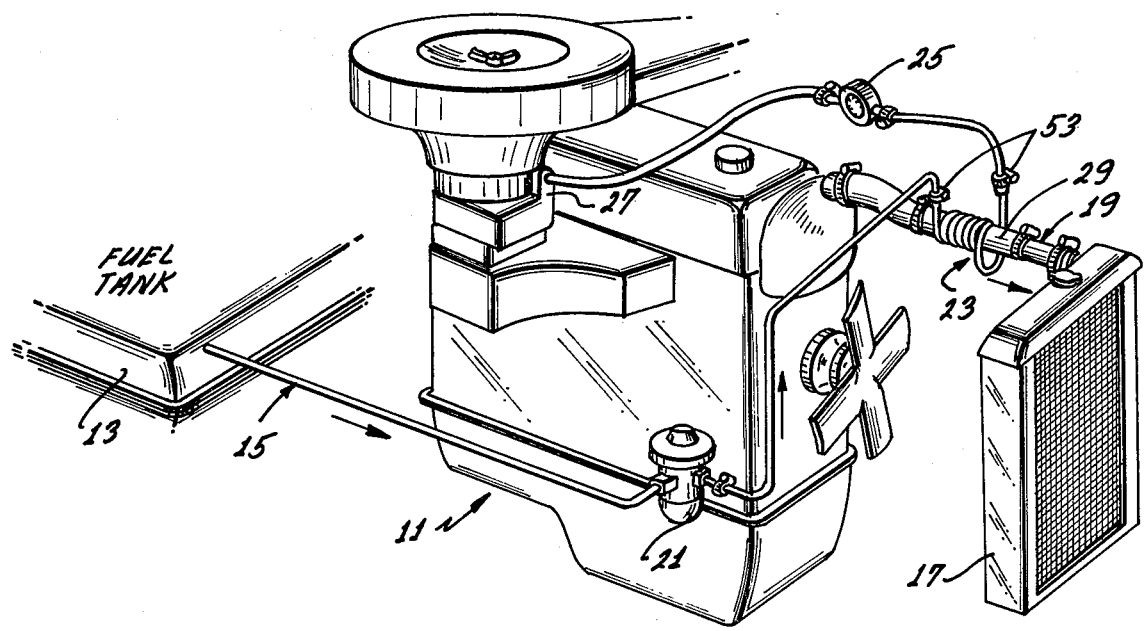
FIG. 1 is a somewhat schematic perspective view of an automobile engine having a fuel preheater constructed in accordance with the teachings of this invention installed thereon.

FIG. 1 shows an engine 11 adapted to receive fuel from a fuel tank 13 via a fuel conduit 15 and to be cooled by coolant furnished by a radiator 17 furnished to the engine by a coolant conduit 19. The fuel supply system includes a fuel pump 21 coupled into the fuel conduit 15, a fuel tube 23 forming a portion of the fuel conduit, an adjustable pressure regulator 25 coupled into the fuel conduit, and a carburetor 27 downstream of the pressure regulator. The coolant conduit 19 includes a coolant tube 29.

Figure 2:
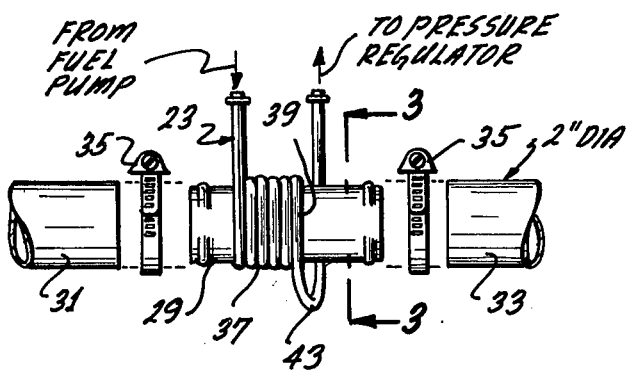
FIG. 2 is a fragmentary side elevational view of one form of fuel preheater.
Figure 3:
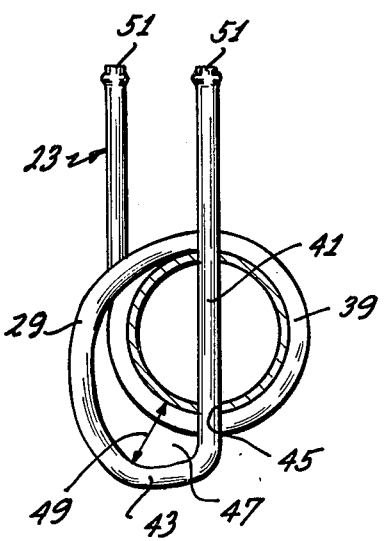
FIG. 3 is an enlarged sectional view taken generally along line 3—3 of FIG. 2.

The fuel tube 23 and the coolant tube 29 form the primary elements of the heat exchanger which preheats the fuel flowing to the engine utilizing heated engine coolant flowing from the engine to the radiator. As shown in FIG. 2, the coolant tube 29 is a separate, relatively short tube which is preferably constructed of a metal having high thermal conductivity. Its opposite ends can be suitably attached to radiator hose sections 31 and 33 which form portions of the coolant conduit 19 by conventional hose clamps 35.

The fuel tube 23 includes a coil 37 having a plurality of convolutions wrapped tightly around the exterior of the coolant tube 29 to provide good heat transfer. The coil includes a most downstream convolution 39 and a downstream section 41 which extends through the coolant tube 29 preferably diametrically. A region 43 of the fuel tube 23 between the most downstream convolution 39 and a location 45 at which the downstream section enters the coolant tube 29 is spaced from the coolant tube by a gap 47. This gap has a maximum radial dimension 49 which is controlled, as described above, and in this embodiment is 1⅛ inch. The maximum dimension 49 is measured in a direction radially of the coolant tube 29. As indicated above, the maximum dimension 49 should have a length of at least 1 1/16 inch and is preferably less than 1¼ inch. The fuel tube 23 has opposite ends 51 which are coupled into adjacent sections of the fuel conduit by conventional clamps 53 (FIG. 1).

The fuel tube 23 is preferably constructed of a metal having high thermal conductivity, and the downstream section 41 is appropriately sealed to the coolant tube 29 at the locations where the downstream section passes through the coolant tube. The fuel tube 23 and the coolant tube 29 can be easily retrofitted into an existing fuel system using the clamps 35 and 53.

In use, fuel is pumped by the fuel pump 21 from the fuel tank 13 through the fuel tube 23 and the pressure regulator 25 to the carburetor 27. The pressure regulator 25 can be manually set to provide the desired fuel pressure downstream of the regulator. The fuel passing through the coil 37 is heated by the warm coolant passing through the coolant tube 29. The presence of the region 43 with the maximum dimension 49 as defined above materially reduces the likelihood of vapor lock.

Although an exemplary embodiment of the invention has been shown and described, many changes, modifications and substitutions may be made by one having ordinary skill in the art without necessarily departing from the spirit and scope of this invention.

I claim:

1. In a liquid-cooled engine having a radiator and an engine block connected thereto by a coolant conduit forming a coolant path, and having a fuel line for conveying fuel from a fuel pump to said engine for combustion, the improvement comprising:
   (a) a metallic coolant tube inserted in said coolant path between said radiator and said engine block so as to cause coolant to flow through said coolant tube; and
   (b) a metallic fuel tube in said fuel line between said fuel pump and said engine;
   (c) said fuel tube being disposed in a generally helical manner around the outside of said coolant tube and in direct contact therewith;
   (d) an end convolution of said helical fuel tube being formed to and extending through said coolant tube in direct contact with the coolant therein; and
   (e) a portion of said helical fuel tube intermediate said portion in direct contact with said coolant tube and said portion extending through said coolant tube being substantially sapced from and thereby not in contact with said coolant tube.

2. The improvement of claim 1, in which said end convolution is the last convolution in the flow direction of said fuel.

3. The improvement of claim 1, in which said end convolution extends diametrically through the center of said coolant tube.

4. The improvement of claim 1, in which the maximum spacing between said spaced portion of said fuel tube and said coolant tube is generally between 1-1/16 inch and 1¼ inch.

5. The improvement of claim 4, in which the maximum spacing between said spaced portion of said fuel tube and said coolant tube is on the order of 1⅛ inch.

* * * * *